United States Patent [19]

Sorenson et al.

[11] Patent Number: 5,042,963
[45] Date of Patent: Aug. 27, 1991

[54] DUAL RANGE AIR TURBINE STARTER

[75] Inventors: Kal K. Sorenson, Tempe; David A. Pratt, Phoenix, both of Ariz.

[73] Assignee: Allied-Signal Inc., Morris Township, Morris County, N.J.

[21] Appl. No.: 331,490

[22] Filed: Mar. 31, 1989

[51] Int. Cl.$^5$ .............................................. F02C 7/275
[52] U.S. Cl. ...................................... 415/18; 415/123; 60/39.142
[58] Field of Search ................ 60/39.142, 39.183, 682, 60/683; 415/18, 122.1, 123; 74/336 R, 336.5; 475/122, 124

[56] References Cited

U.S. PATENT DOCUMENTS

| | | | |
|---|---|---|---|
| 2,625,049 | 1/1953 | Wood | 60/39.142 |
| 2,874,585 | 2/1959 | Lasley | 74/336.5 |
| 3,481,145 | 12/1969 | Oldfield | 60/39.142 |
| 3,521,505 | 7/1970 | Sebring | 60/39.142 |
| 3,797,247 | 3/1974 | Schwartzman | 60/682 |
| 4,542,722 | 9/1985 | Reynolds | 74/336 R |

Primary Examiner—Louis J. Casaregola
Attorney, Agent, or Firm—Terry L. Miller; James W. McFarland; Robert A. Walsh

[57] ABSTRACT

An air turbine starter for use aboard aircraft includes a dual range power train and a clutch automatically shifting between the ranges according to the use being experienced by the starter. Main engine starts may be achieved more quickly, while ground check out of aircraft systems using the starter to power main engine accessory devices via the engine gear box may be performed with better power input to the accessories and improved efficiency.

16 Claims, 2 Drawing Sheets

DUAL RANGE AIR TURBINE STARTER

TECHNICAL FIELD

The present invention is in the field of air turbine starters employed upon aircraft for starting of propulsion turbine engines of the aircraft. More particularly, the present invention relates to a dual range air turbine starter having a low-speed range with comparatively higher torque for effecting rapid main engine starting, and a high-speed range providing improved starter horsepower output in a speed range required for ground check out (GCO) of aircraft systems which are ordinarily powered by the propulsion engines.

BACKGROUND OF THE INVENTION

Air turbine starters are conventionally employed in the aerospace field for starting of propulsion turbine engines of various types. For aircraft propulsion engine starting, the air turbine starter may receive pressurized air as motive fluid from a storage source aboard the aircraft, from another propulsion engine of the aircraft, or pressurized air may be provided by a portable ground start cart. Such carts usually employ a turbine engine or piston engine to drive an air compressor. Whatever source of pressurized air is employed, the air turbine starter accelerates the propulsion engine from a stop to and beyond its self-sustaining speed. Even after the propulsion turbine engine attains self-sustaining speed, torque delivery from the air turbine starter is continued to assist acceleration of the propulsion turbine engine toward its operating speed range. When the air turbine starter reaches its cut out speed, that is, the upper limit of its operating speed range, the supply of pressurized air to the starter is cut off. The propulsion turbine engine continues to accelerate toward its operating speed range, while a clutch prevents back driving of the air turbine starter by the turbine engine. During operation of the propulsion turbine engine an electric generator and hydraulic pump may be driven from the engine. These accessory devices are generally employed to power electrical and hydraulic devices of the aircraft.

On the other hand, it is desirable to operate various electrical and hydraulic systems of an aircraft while the latter is on the ground. This operation of the accessory devices is generally for the purpose of verifying correct operation, or performing maintenance procedures and checks, and is generally referred to as ground check out (GCO) of the aircraft. Unfortunately, operation of the propulsion turbine engine may be required in order to operate the accessory devices to provide ground check out power for the aircraft. Of course, operating a propulsion engine simply for ground check out purposes is undesirable. Such use adds operating time to the propulsion engine, is not fuel efficient, and presents a hazard to ground maintenance personnel around the aircraft.

However, operation of the propulsion engine may be necessary in order to drive the accessory devices within their normal operating speed range. Some success has been achieved at decoupling the propulsion engine from the accessory drive gearbox and driving the accessory devices via the air turbine starter while using a ground start cart to power the starter. This solution to the problem of providing ground check out power is not completely satisfactory because the starter must be operated above its starting speed range in order to drive the accessory devices fast enough. That is, the starter is being operated at a higher speed than it would experience during starting operation in order to power accessories which during their normal flight operation would be driven to a higher speed by the propulsion turbine engine. Such use of the air turbine starter, which may be protracted in comparison to its duty time in engine starting, both exposes the starter to long-duration high speed operation and resulting wear, and results in an inefficient power output from the starter. This latter effect results from the rapid drop off of torque production by a fixed-geometry air turbine once its speed of optimum torque production is exceeded. However this high speed operation of the starter is required to meet the speed range requirements of the accessory devices, and necessarily results in decreased operating efficiency during GCO.

SUMMARY OF THE INVENTION

In view of the deficiencies of conventional air turbine starter/GCO apparatus and systems, it is recognized as desirable to provide an air turbine starter which in one range of operation will provide optimized torque output for starting of an aircraft propulsion engine, and in another range of operation will provide the high output speed needed for driving accessory devices at a favorable power output efficiency.

Further to the above, it is recognized as desirable to provide such an air turbine starter which switches between its two ranges of operation automatically in response to the experienced operating condition, and without a need for external range-selecting input.

Accordingly, the present invention provides an air turbine starter including a housing journaling both a turbine member for extracting shaft power from a flow of pressurized air, and an output shaft for delivering the shaft power to a turbine engine or accessory devices associated with the turbine engine, first ratio speed reduction power train means coupling the turbine to the output shaft, second ratio speed reduction power train means of ratio different than said first ratio means and also coupling said turbine with the output shaft, and clutch means defining a part of both said first ratio means and said second ratio means for selectively coupling one of the latter between said turbine and said output shaft.

Additionally, the present invention provides an air turbine starter of the above-described character wherein the clutch means is centrifugally-responsive to shift between said first ratio means and said second ratio means according to the rotational speed of said turbine and output shaft.

Still further, the present invention provides an air turbine starter as described above wherein the centrifugally-responsive clutch is hydraulically actuated, and hydraulic pressure fluid for operation of the clutch is generated by virtue of and in response to operation of the air turbine starter itself.

An advantage of the present invention resides in its operation in a first speed range during engine starting use with comparatively increased torque output, and a quicker main engine starting time than otherwise would be possible; and its operation in a second speed range during GCO use without excessively high turbine speed, and with better power output and operating efficiency.

Yet another advantage of the present invention resides in its automatic shift between the first and second speed ranges according to the use of the starter, and completely without an input from the aircraft flight crew or maintenance crew. This automatic range selection feature of the invention both eliminates the need for a maintenance crew step, or flight crew check list item, and removes the possibility of the starter being operated in the other of its two ranges during engine starting, or GCO use.

BEST MODE FOR CARRYING OUT THE INVENTION

Figure 1:
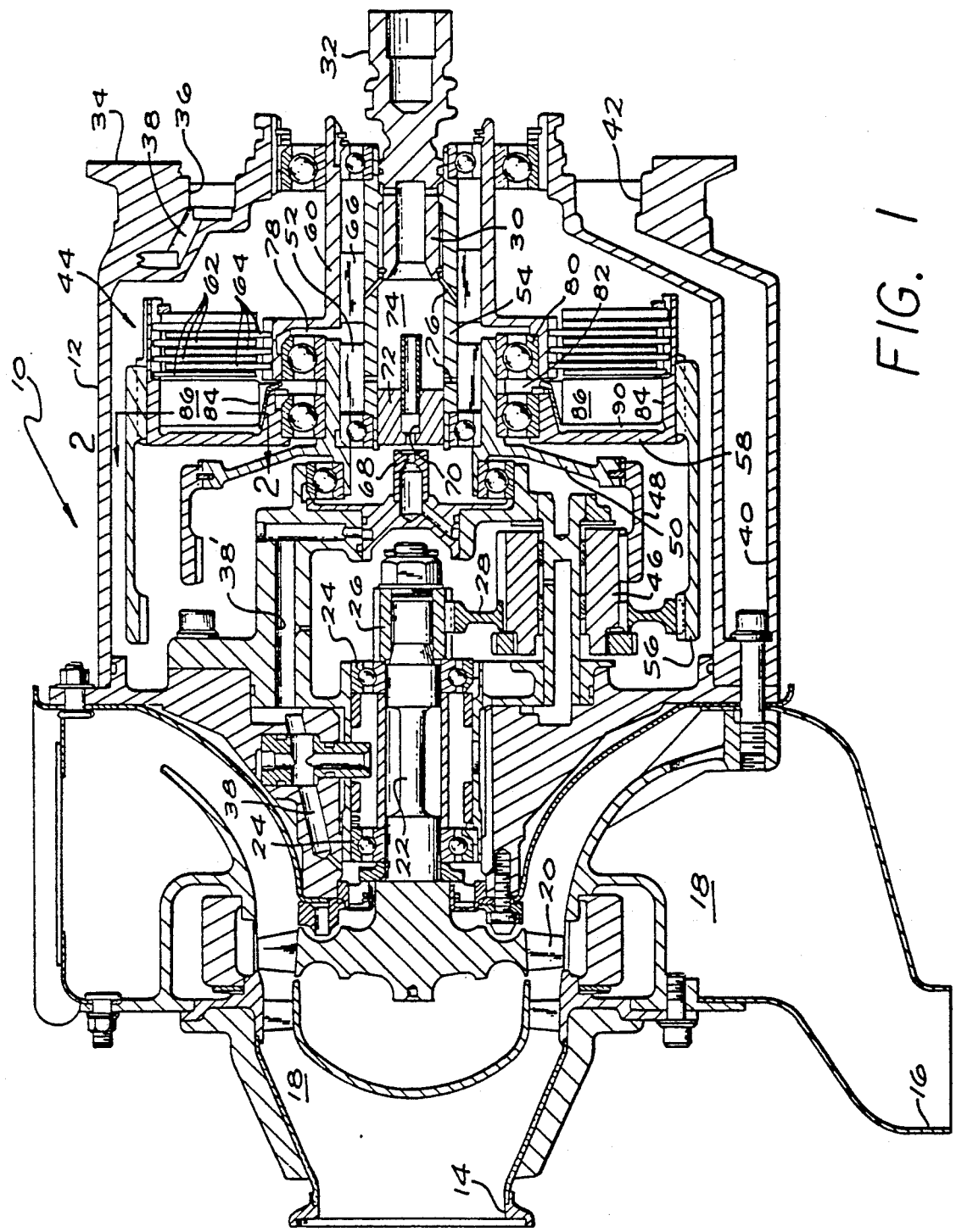
FIG. 1 provides a longitudinal view, partially in cross-section, of an air turbine starter embodying the invention.

FIG. 1 depicts an air turbine starter 10 embodying the present invention. The air turbine starter 10 includes a housing 12 defining an inlet 14 and an outlet 16. The housing 12 defines a flow path 18 extending between the inlet 14 and the outlet 16. An axial flow turbine member 20 is rotatably journaled by the housing 12 in the flow path 18 for extracting mechanical energy from a flow of pressurized fluid conducted between the inlet 14 and the outlet 16 via the flow path 18. The turbine member 20 is carried by a rotatable shaft 22 journaled by bearings 24 carried by the housing 12. Secured to the shaft member 22 is a pinion gear member 26 engaging three identical speed-reducing gears 28, only one of which is visible in FIG. 1. The gears 28 are arrayed at equiangular positions around pinion gear 26. Also journaled by the housing 12 is a rotatable output shaft 30 extending outwardly of the housing 12. The shaft 30 includes a terminal portion 32 which is splined to drivingly engage with a power distribution gear box (not shown) of a turbine engine (also not shown). Housing 12 defines a mounting face at 34 which sealingly engages with the engine gear box in order to receive oil lubricant for the starter 10 at a port 36. The port 36 communicates with internal passages 38, (which are only partially shown) defined by the housing 12 for distribution of the lubricating oil therein. A sump passage 40 provides for collection of oil within the starter 10 and communication of the collected oil to the gear box via a port 42 opening on face 34. The gear box of the turbine engine will conventionally have an oil pump driven when either the propulsion engine or starter 10 power the gear box.

A dual-range speed reduction power train generally referenced with the numeral 44 is received in the housing 12 and drivingly connects the shaft 22 with the output shaft 30. The power train 44 includes a first ratio gear train including: a pinion 46 carrying and drivingly connecting with gear 28; an internally toothed tubular gear member 48 meshing with pinion 46; a spider member 50 carrying gear 48; and a one-way overrunning sprag clutch 52 drivingly connecting the spider member 50 with a tubular shaft 54. The tubular shaft 54 carries and drivingly connects with output shaft 30.

A second ratio gear train having a speed reduction and torque multiplication less than the first ratio gear train also connects the shaft 22 with output shaft 30. This second ratio gear train includes an internally toothed turbular gear member 56 which meshes with gear 28, and which is carried by a clutch plate member 58. The clutch plate member 58, in cooperation with a relatively rotatable clutch hub member 60, carries respective pluralities of relatively rotatable friction disc members 62 and 64. The friction disk members 62 are carried by plate member 58, while the disk members 64 are carried by hub member 60. When the friction disk members 62 and 64 are forced axially into driving engagement with one another, as is further explained below, the plate member 58 and hub member 60 are drivingly connected. A one way overrunning sprag clutch 66 connects the clutch hub 60 with tubular shaft 54.

In order to provide oil flow to the internal components of the starter 10, including the sprag clutches 52, 66 and clutch 58-64, the passages 38 include a portion 38' extending to a central nozzle member 68 aligning with an opening 70 defined by an oil dam member 72 carried within tubular shaft member 54. During operation of the gear box (not shown) to which the starter 10 is mounted, either by virtue of operation of the propulsion turbine engine (not shown), or operation of the starter 10, oil is pumped via the passages 38 and 38' to nozzle 68, and a small jet of oil is delivered via opening 70 into a chamber 74 within shaft 54. From the chamber 74 this oil flows via small radially extending passages 76 to the sprag clutches 52 and 66. A part of this oil flow exits the clutches 52, 66 into an annular space 78 extending radially outwardly from the clutches 52, 66, and flows through a bearing 80 to an annular space 82.

Figure 2:
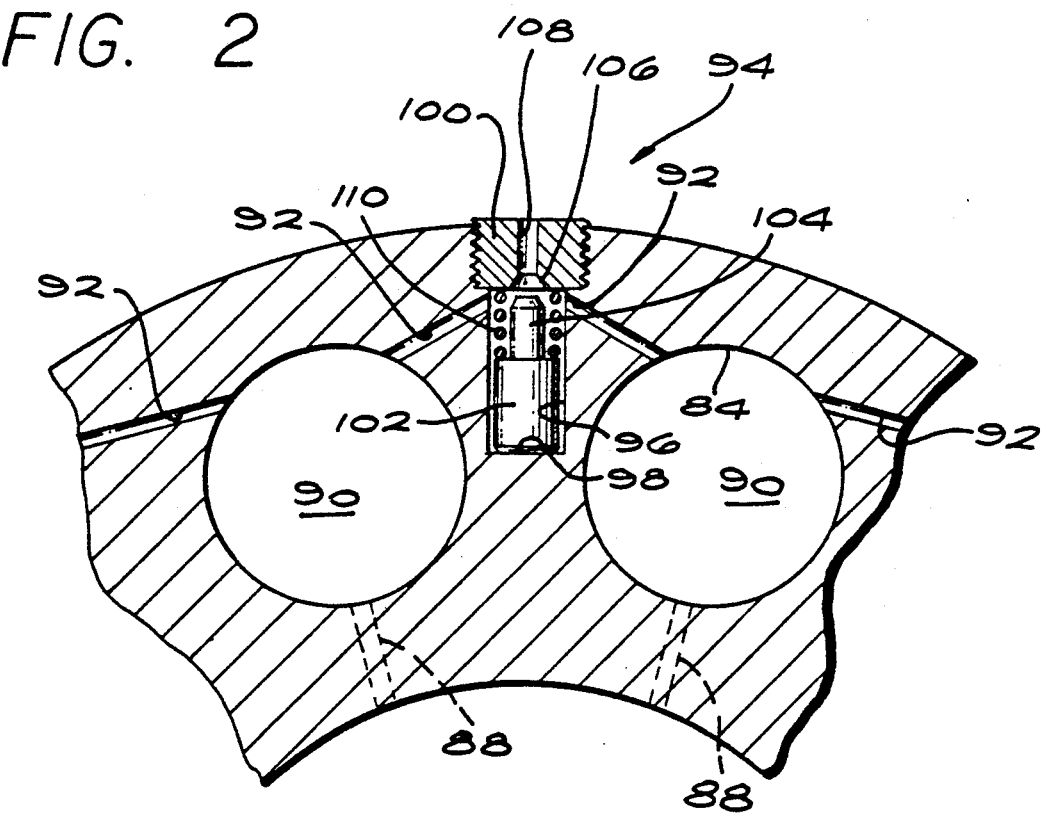
FIG. 2 presents a fragmentary cross-sectional view at an enlarged scale taken along line 2—2 of FIG. 1.

It will be seen, viewing FIGS. 1 and 2, that the clutch plate member 58 defines a plurality of circumferentially arrayed axially extending closed bores 84. A like plurality of piston members 86 are sealingly and reciprocably received individually in respective ones of the bores 84. Respective small passages 88 defined by the plate member 58 communicate oil from annular space 82 to a radially inner portion of respective chambers 90 defined in the bores 84 by the cooperation of pistons 86 with plate member 58. Viewing FIG. 2, it will be seen that the chambers 90 also communicate with one another at radially outer locations via a plurality of interconnecting passages 92. One of the interconnecting passages 92 includes a centrifugally responsive valve device generally referenced with the numeral 94. The valve device 94 includes a radially extending blind bore 96 defined by the plate member 58 intermediate of two adjacent ones of the bores 84, and to which passages 92 open. Trapped within the bore 96 between an end wall 98 thereof and an annular plug member 100 threadably engaging the plate member 58 is a radially movable mass 102. The mass 102 includes a radially extending valve portion 104 sealingly engageable with the plug member 100 at a seat 106 defined at the radially inner end of a passage 108 which opens outwardly through the plug member 100. A coil compression spring 110 extends between the plug member 100 and mass 102 to bias the latter to a first radially inner position in engagement with wall 98, and wherein the valve portion 104 is unseated from sea 106. In this first position of the valve device 94, oil may flow through the passages 88, chambers 90, interconnecting passages 92, and passage 108.

During operation of the starter 10, a flow of pressurized air traverses the flow path 18 via inlet 14 and outlet 16. The turbine 20 extracts shaft power from this air flow and rotates the components of the dual-range power train 44 via shaft 22, pinion 26, and gear 28. From a standstill, up to a determined turbine speed (and speed of output shaft 30), the first ratio gear train transmits this shaft power to the output shaft 30. The clutch plate 58 of the second ratio gear train rotates faster than shaft 54 and output shaft 30. However, the clutch 58–64 is disengaged so that no torque transfer to the clutch hub member 60 occurs. It will be recalled that there is a direct ratio relationship between speed of turbine 20 and rotational speed of clutch plate 58. However, between a standstill and the determined speed, valve device 94 is maintained in its first (open) position by the preload and spring rate of spring 110. This phase of operation is depicted on the graph of FIG. 3 by line 112.

When the turbine 20 attains the determined rotational speed, the clutch plate 58 has a corresponding ratioed lower speed whereat the centrifugally responsive valve device 94 closes. That is, the force effective on mass 102 due to centrifugal force at the rotational speed of clutch plate 58 overcomes the preload and spring rate of spring 110, and moves to a second radially outer position sealingly engaging valve portion 104 with seat 106. Consequently, oil is thereafter trapped in the chambers 90 and is no longer able to flow out of passage 108 in response to the prevailing centrifugal force field. The result is that pressurized oil is trapped in each of the chambers 90 and moves the pistons 86 to frictionally engage the disks 62, 64 with one another. This pressurized oil in chambers 90 results from the weight of the oil itself and the prevailing centrifugal force, and has a radial pressure gradient increasing from the radially inner extent to the radially outer extent of the chambers 90. However, the cumulative pressure force effective on the pistons 86, combined with the number of the pistons is sufficient to positively engage the clutch 58–64. This clutch engagement event is depicted on FIG. 3 as cusp 114.

Figure 3:
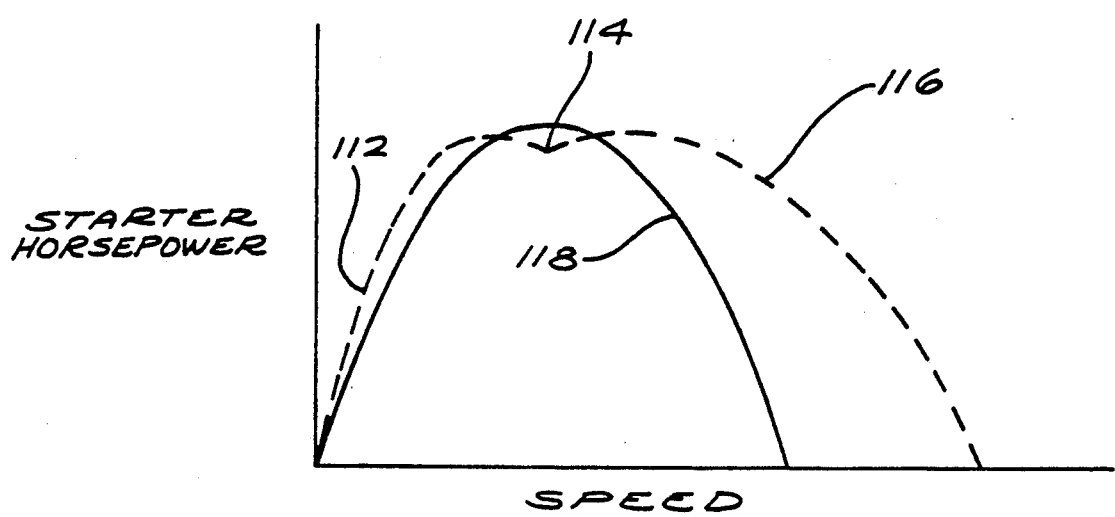
FIG. 3 graphically depicts the horsepower output versus speed curves for a conventional single range air turbine starter and for a starter according to the invention.

Upon and subsequent to engagement of the clutch 58–64, torque is transferred to output shaft 30 via the second ratio gear train, with sprag clutch 52 allowing the shaft 54 to overrun with respect to spider member 50. This speed range of starter operation is represented on FIG. 3 by line 116. For purposes of comparison, line 118 on FIG. 3 depicts the power output of a conventional single range air turbine starter. It is quickly seen that the conventional starter displays a drastic power decrease beyond its peak horsepower as torque generation drops off. The air turbine starter according to the present invention provides a greater power output over a considerably wider speed range than a comparable conventional starter. A result of the present invention may be main engine starting in a decreased time, or GCO operation with improved power and fuel efficiency, or a combination of these advantages.

What is claimed is:

1. A dual range air turbine starter comprising a housing defining an inlet, an outlet, and a flow path communicating said inlet with said outlet for conveying a flow of pressurized air therebetween, a turbine member journaled by said housing in said flow path extracting shaft power from said flow of pressurized air, an output shaft for delivering said shaft power externally of said starter, and dual range power train means for drivingly coupling said turbine member with said output shaft, wherein said dual range power train means includes first ratio power train means drivingly connecting said turbine member with said output shaft, second ratio power train means having a ratio different than said first ratio power train means and also drivingly coupling said turbine member with said output shaft, and selectively engageable clutch means by its engagement and disengagement selecting one or the other of said first ratio and said second ratio power train means, further including a one-way overrunning clutch interposed in one of said first ratio power train means or in said second ratio power train means and permitting overrunning when the other of said power train means is selected for transmitting torque between said turbine member and said output shaft, and wherein both of said first ratio power train means and said second ratio power train means include a respective one way overrunning clutch.

2. The invention of claim 1 wherein said selectively engageable clutch means is centrifugally responsive to select one of said first ratio power train means and said second ratio power train means in a first corresponding speed range for said output shaft and selecting the other of said power train means in another speed range for said output shaft.

3. The invention of claim 2 wherein said selectively engageable clutch, means includes a fluid pressure responsive actuator actuation of which engages said clutch, and means generating pressurized liquid for said actuator in response to operation of said air turbine starter, flow path means venting said pressurized liquid from said actuator preventing actuation thereof, and centrifugally responsive valve means for closing said venting flow path upon said turbine member attaining a determined rotational speed.

4. The invention of claim 3 wherein said means generating pressurized liquid for said actuator includes a rotational body rotating in response to rotation of said turbine member, pressurizing flow path means communicating within said rotational body from a radially inner inlet thereof to a radially outer extent communicating with said actuator, and means introducing liquid to said inlet, whereby said liquid by its own weight is pressurized by centrifugal force effective upon said rotational body and liquid during rotation of said turbine member.

5. The invention of claim 4 wherein said venting flow path opens radially outwardly from said outer extent of said pressurizing flow path means.

6. The invention of claim 4 wherein said centrifugally responsive valve means comprises a mass carried by and relatively movable radially with respect to said rotational body, resilient means urging said mass yieldably to a first radially inner position, said mass moving radially outwardly to a second position in response to centrifugal force at said determined speed, and a valve member respectively opening and closing said venting flow path in response to movement of said mass between said first and second positions.

7. The invention of claim 4 wherein said liquid pressure responsive actuator includes said rotational body defining a bore opening outwardly thereon, an actuator piston member sealingly and reciprocably received in said bore, and cooperating with said body to define an actuator chamber, and said actuator chamber defining a part of said pressurizing flow path means.

8. An air turbine starter comprising:
a housing defining an inlet, an outlet, and a flow path communicating said inlet with said outlet for conveying a flow of pressurized air therebetween;
an air turbine member journaled by said housing in said flow path for extracting shaft power from said flow of pressurized air:
an output shaft journaled by said housing for coupling said shaft power externally of said starter;

a first ratio low speed gear train coupling said air turbine member with said output shaft, said first ratio gear train including a respective one-way overrunning clutch transmitting torque to said output shaft and preventing back driving from said output shaft into said first ratio gear train; and a second ratio high speed gear train coupling said air turbine member with said output shaft, said second ratio gear train including a selectively engageable clutch engagement of which transmits torque to said output shaft in the same direction as said first ratio gear train and at an increased speed, whereby engagement of said clutch drives said output shaft at an increased speed and causes overrunning of said one-way clutch.

9. The invention of claim 8 wherein said second ratio gear train also includes a respective one-way overrunning clutch interposed between said selectively engageable clutch and said output shaft for transmitting torque to the latter and preventing back driving from said output shaft into said second ratio gear train.

10. The invention of claim 8 wherein said selectively engageable clutch is centrifugally responsive to remain disengaged from a standstill to a determined engagement speed, whereby said air turbine starter provides a low-speed high-torque output from a standstill to said determined speed via said first ratio gear train and a high-speed lower-torque output above said determined speed upon engagement of said selectively engageable clutch and said second ratio gear train.

11. The invention of claim 10 wherein said selectively engageable clutch includes a fluid pressure responsive actuator, and centrifugal means rotating with said second ratio gear train for generating pressurized liquid to actuate said clutch in response to centrifugal force.

12. The invention of claim 11 further including centrifugally responsive valve means open below said determined speed to vent said pressurized liquid, said valve means closing at said determined speed to trap pressurized liquid in said fluid pressure responsive actuator to engage said selectively engageable clutch.

13. The invention of claim 12 wherein said fluid pressure responsive actuator includes a body rotating with said second gear train and defining a working actuator chamber spaced radially from the axis of rotation, said centrifugal pressure generating means including flow path means providing for flow of liquid into said actuator chamber at a radially inner location and flow from said actuator chamber at a radially outer location via said centrifugally responsive valve means.

14. The invention of claim 13 wherein said liquid is lubricating oil.

15. The invention of claim 13 wherein said body carries also a plurality of friction elements which are forced into torque transmitting frictional engagement in response to actuation of said fluid pressure responsive actuator to engage said selectively engageable clutch.

16. A dual range air turbine starter comprising a housing defining an inlet, an outlet, and a flow path communicating said inlet with said outlet for conveying a flow of pressurized air therebetween, a turbine member journaled by said housing in said flow path extracting shaft power from said flow of pressurized air, an output shaft for delivering said shaft power externally of said starter, and dual range power train means for drivingly coupling said turbine member with said output shaft, wherein said dual range power train means includes first ratio power train means drivingly connecting said turbine member with said output shaft, second ratio power train means having a ratio different than said first ratio power train means and also drivingly coupling said turbine member with said output shaft, and selectively engageable clutch means by its engagement and disengagement selecting one or the other of said first ratio and said second ratio power train means, further including a one-way overrunning clutch interposed in said first ratio power train means and permitting overrunning when the other of said power train means is selected for transmitting torque between said turbine member and said output shaft.

* * * * *